United States Patent
Firstenberg et al.

(10) Patent No.: US 9,137,191 B2
(45) Date of Patent: Sep. 15, 2015

(54) MESSAGING FOR NOTIFICATION-BASED CLIENTS

(75) Inventors: Yosef Firstenberg, Redmond, WA (US); Lan Tang, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 141 days.

(21) Appl. No.: 13/049,913

(22) Filed: Mar. 17, 2011

(65) Prior Publication Data
US 2012/0239757 A1  Sep. 20, 2012

(51) Int. Cl.
*G06F 15/16* (2006.01)
*H04L 12/58* (2006.01)

(52) U.S. Cl.
CPC .............. *H04L 51/24* (2013.01); *H04L 12/587* (2013.01); *H04L 51/04* (2013.01); *H04L 51/38* (2013.01)

(58) Field of Classification Search
CPC ....... H04L 51/24; H04L 12/587; H04L 51/38; H04L 51/04
See application file for complete search history.

(56) References Cited

U.S. PATENT DOCUMENTS

| | | | |
|---|---|---|---|
| 4,965,718 A * | 10/1990 | George et al. ............. | 718/104 |
| 6,195,702 B1 | 2/2001 | Cole et al. | |
| 6,292,825 B1 | 9/2001 | Chang et al. | |
| 6,480,885 B1 * | 11/2002 | Olivier ........................ | 709/207 |
| 7,660,856 B2 | 2/2010 | O'Brien et al. | |
| 7,822,820 B2 * | 10/2010 | LeVasseur et al. .......... | 709/206 |
| 2006/0155811 A1 * | 7/2006 | Goh et al. .................... | 709/206 |
| 2006/0195557 A1 * | 8/2006 | Dew et al. .................... | 709/220 |
| 2007/0073817 A1 | 3/2007 | Gorty | |
| 2007/0203995 A1 | 8/2007 | Wang et al. | |
| 2008/0065725 A1 | 3/2008 | Choi | |
| 2008/0293403 A1 * | 11/2008 | Quon et al. ................. | 455/426.1 |
| 2010/0008272 A1 | 1/2010 | Messinger et al. | |
| 2010/0009725 A1 | 1/2010 | Banerjea | |
| 2010/0088387 A1 | 4/2010 | Calamera | |
| 2011/0066841 A1 * | 3/2011 | Goodrow et al. ............. | 713/150 |
| 2011/0252146 A1 * | 10/2011 | Santamaria et al. .......... | 709/227 |

FOREIGN PATENT DOCUMENTS

| | | |
|---|---|---|
| EP | 1675352 A1 | 6/2006 |
| KR | 1020060033656 A | 4/2006 |
| KR | 1020060062201 A | 6/2006 |
| KR | 1020080081434 A | 9/2008 |
| KR | 100902745 A | 6/2009 |

OTHER PUBLICATIONS

"International Search Report", Mailed Date: Sep. 28, 2012, Application No. PCT/US2012/027928, Filed Date: Mar. 7, 2012, pp. 10. English.

Jin, KE., "Notification Service for EJB", Retrieved at << http://www.borland.com/resources/en/pdf/white_papers/notification_service_for_ejb_seamless.pdf >>, Nov. 2002, p. 1-13.

"Extended European Search Report Issued in European Patent Application No. 12757141.2", Mailed Date: Aug. 5, 2014, 7 pages.

* cited by examiner

*Primary Examiner* — Wen-Tai Lin
(74) *Attorney, Agent, or Firm* — Aneesh Mehta; Stein Dolan; Micky Minhas

(57) ABSTRACT

The claimed subject matter provides a method for communicating with a client. The method includes receiving a notification token that identifies the client. The method further includes registering the client to receive a message when the client is not connected to the server. The method also includes sending the message to the client when the client does not have a connection to the server, based on the registering and the notification token. The message may be sent using a notification channel.

20 Claims, 10 Drawing Sheets

100

400

900

MESSAGING FOR NOTIFICATION-BASED CLIENTS

BACKGROUND

Client-server communications systems may vary in terms of when the server may send a communication to the client. For example, communications between a website (server) and a client may follow a request-response model. In this model, the client may be reachable from the server if the client is sending a request to the server. The client may otherwise be unreachable. As such, the server may only send communications to the client in response to a client request. In this model, the client request may result in an open network connection over which the server may send communications.

This model differs from traditional messaging systems. Traditional messaging systems assumed the existence of a connection between clients and servers. Because the connection persists, the server may send a communication to the client at any time.

On increasing numbers of platforms, e.g., mobile devices, maintaining network connections is resource intensive. For example, mobile devices may quickly drain battery power by trying to maintain a network connection. As such, these platforms may not maintain network connections when client applications are not active.

Maintaining a network connection may be further impeded by limitations of the networks themselves. In some cases, networks may not be reliable. For example, cell phones lose their network connections in regions without appropriate cellular towers.

Typical approaches to these types of connectivity issues still rely on creating open network connections between the client and the server. Depending on open network connections for communications between clients and servers increases the demand on the limited resources of increasing numbers of client devices.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The subject innovation relates to a method and a system for communicating with a client that is not connected to a server. The client may register notification channel information with the server. The server may send a message to the client using the notification channel. The messages may be included in a notification message to the client. Alternatively, the message may be sent using a shoulder tapping technique.

In one embodiment, the client may subscribe to buddies, services, or networks. By subscribing, the client may be automatically notified of corresponding updates over the notification channels. The following description and the annexed drawings set forth in detail certain illustrative aspects of the claimed subject matter. These aspects are indicative, however, of a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 1:
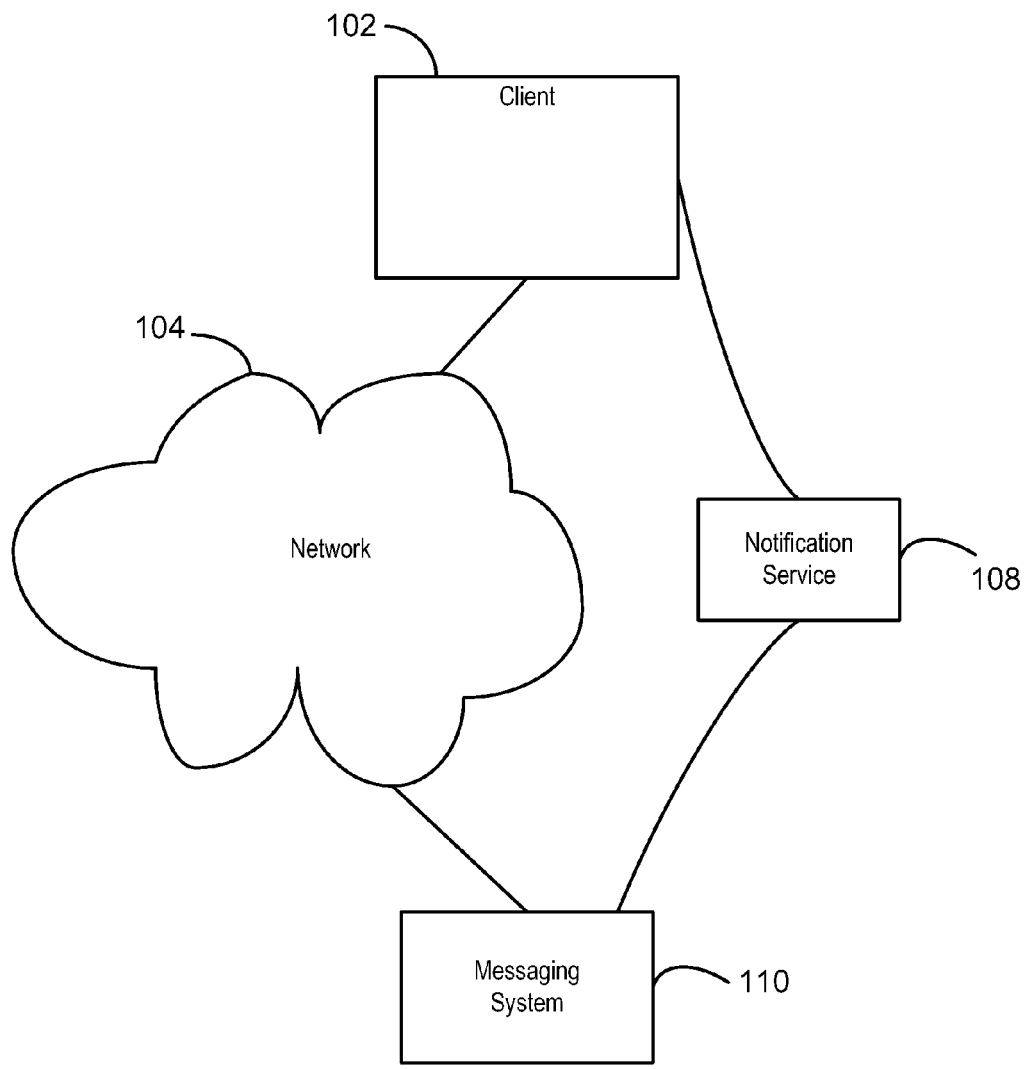
FIG. 1 is a block diagram of a system in accordance with the claimed subject matter.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," "client" and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware.

By way of illustration, both an application running on a server and the server can be a component. One or more components can reside within a process and a component can be localized on one computer and/or distributed between two or more computers. The term "processor" is generally understood to refer to a hardware component, such as a processing unit of a computer system.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any non-transitory computer-readable device, or media.

Non-transitory computer-readable storage media can include but are not limited to magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). In contrast, computer-readable media generally (i.e., not necessarily storage media) may additionally include communication media such as transmission media for wireless signals and the like.

Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

For increasing numbers of mobile platforms, messaging systems may use an open network connection between the client and the server to enable the server to send messages to the client. However, when the client is not able to establish a long-lived connection, the connection may be simulated.

As stated previously, mobile platforms introduce challenges with respect to maintaining the connection between the client and the server, including: 1) due to the nature of the communication channel, e.g., wireless, the connection may not be reliable, 2) maintaining the connection to the server consumes battery resources which are limited on those platforms, and 3) wireless connections may be more limited in terms of bandwidth than wired connections.

To address these challenges, messaging systems may reduce bandwidth consumption, and add resiliency logic to the transport layer of a communications protocol. Adding resiliency logic to the transport layer typically enables messaging systems to recover from intermediate connectivity issues.

FIG. 1 is a block diagram of a system 100 in accordance with the claimed subject matter. The system 100 includes a client 102, a network 104, a notification service 108, and a messaging system 110. The client 102 may be a device with a client application that communicates over the network 104 with the messaging system 110. The client 102 may be any type of communications or computing device, such as a mobile telephone, personal digital assistant, a desktop computer, etc. The platform on which the client 102 runs may include a set of APIs to interact with a notification service 108. The notification service 108 may be another cloud service provided by a platform that the client 102 runs on. For example, on a Windows Phone, the notification service 108 may be the Microsoft Push Notification service (MPN). An iPhone client may use the Apple Push Notification service (APN). For clients 102 that run on a platform that does not provide native notification service APIs, the messaging system 110 may provide an alternative.

The notification service 108 may provide one or more notification channels that a cloud service may use to send information to the client 102 that a) may conserve battery life and b) may be configured to overcome inherent network challenges described above, such as intermittent connectivity to the network 104. Usually the connection from the client 102 to the notification service 108 may be allowed to be opened to preserve client resources.

The network 104 may be any network or collection of networks, capable of supporting communications between the client 102 and the messaging system 110. The network 104 may be the Internet, a wide area network, a local area network, etc. The Internet is also referred to herein as a cloud.

The notification service 108 may be used as part of a messaging system 110, used for communicating messages from the messaging system 110 to the client 102. As such, the messaging system 110 may enable typical messaging system functionality, including: messaging, signaling, presence, audio, video, etc. In one embodiment, this functionality may be provided in the absence of a connection between the client 102 and the messaging system 110.

Presence may represent the availability and capabilities of the client 102 at a given moment for certain operations. In typical messaging systems, the availability of the client 102 is closely connected with a connection state. Where is no connection, the client 102 is assumed to be unavailable. In embodiments of the invention, when there is no connection, the client 102 may be available through the notification service 108.

Instead of communicating through an open network connection, the messaging system 110 may communicate with the client 102 using the notification service 108. The messaging system 110 may use a protocol that natively supports the notification service 108 as part of a client connectivity scheme. In one embodiment, the protocol may support this type of client 102, i.e., a notification-based client, as a first class entity, and provide constructs that natively fit various platforms for the client 102.

In such an embodiment, the messaging system 110 may use a non-connected client mode. In this mode, a client entity may be provided by a cloud service, without necessarily having an open network session. The client 102 may be reachable using other means, such as the notification service 108.

The protocol may include commands, for registering and unregistering clients, updating clients, sending messages, subscribing to buddy lists, querying for buddies, querying and delivering messages, and supporting multiparty communications. These commands are described in greater detail with reference to FIGS. 4-9.

Some differences of this protocol from existing protocols include: 1) the removal of the session as a condition of the existence of the client entity in the cloud, and 2) the use of the non-connected mode as a way to interact with the cloud service.

The cloud service may store data about the notification service 108. The notification service 108, or an open network session (if it exists), may be used to communicate back to the client 102. This protocol may natively support a variety of notification platforms. Using this protocol, the messaging system 110 may also provide notification services to clients that do not provide notification services, e.g., web clients. In one embodiment, this may be done using the same semantics as defined by other notification services over a persistent transport layer service.

In one embodiment, the messaging system 110 may generate an authentication token as a way to authenticate the client and to control the lifetime of the client entity in the cloud. The messaging system 110 may store the notification channel information to be used to communicate back to the client 102. The notification channel is a way for the messaging system 110 to send a message to the client 102 using the notification service 108. Additionally, the messaging system 110 may store information about any potential open network session, if such a connection exists. This connection information may be used as an alternative way to communicate back to the client 102. The client 102 may send the authentication token with every request, expecting to receive authentication failure responses, and be able to re-authenticate to the messaging system 110.

When the client 102 is sending messages to the messaging system 110, the client may use connected or non-connected means. In one embodiment, the client 102 may use a non-connected channel. In an alternative non-connected means, the client 102 may open a temporary channel for ad-hoc communications and use TCP-based commands. This may be done without explicitly connecting or re-connecting to the messaging system 110.

In terms of connected means, the client 102 may explicitly connect to the messaging system 110 for the duration of one or more conversations. The client 102 may be limited to a single connection to the cloud at any given time, which may be enforced by the messaging system 110.

The protocol may not define the client presence status in the cloud, but rather the mechanism in which the client 102 may update its specific presence information, e.g., availability and capabilities. The protocol may also provide a way for those with a relationship to the user (for example, a connection on a social or professional website) to receive updates when applicable. Because of connectivity and process privilege constraints, the client 102 may not accurately update its presence. Instead, the protocol may assume that business logic on the messaging system 110 updates the client presence. This can be done based on time interval (i.e. "minute from last activity"), notification channel status (i.e. "periodic ping test" or "error responses"), or explicit update by the client 102 itself when possible.

The protocol may support one way to register or unregister the client entity. However, the messaging system 110 may not enforce registering or unregistering the client 102 using the protocol. There may be other ways to add client entities to the messaging system 110. For example, the messaging system 110 may query an external authoritative source, such as another cloud service that keeps track of the clients 102. As long as the client 102 presents a valid token, the messaging system 110 may serve the requests. The security challenges implicated by this approach may be addressed by using a secured communication channel.

To further preserve battery life and reduce bandwidth consumption, the protocol may free the client 102 from uploading any data that already exists in any authoritative entity in the cloud. Instead, the client 102 may merely upload client-specific and transient data. The messaging system 110 may store a limited amount of state information for each client. This state may include, for example, notification channel information, access control lists (ACLs), availability and capabilities, subscriptions, cached instant messages (IMs) or notifications, and last activity time information.

Figure 2:
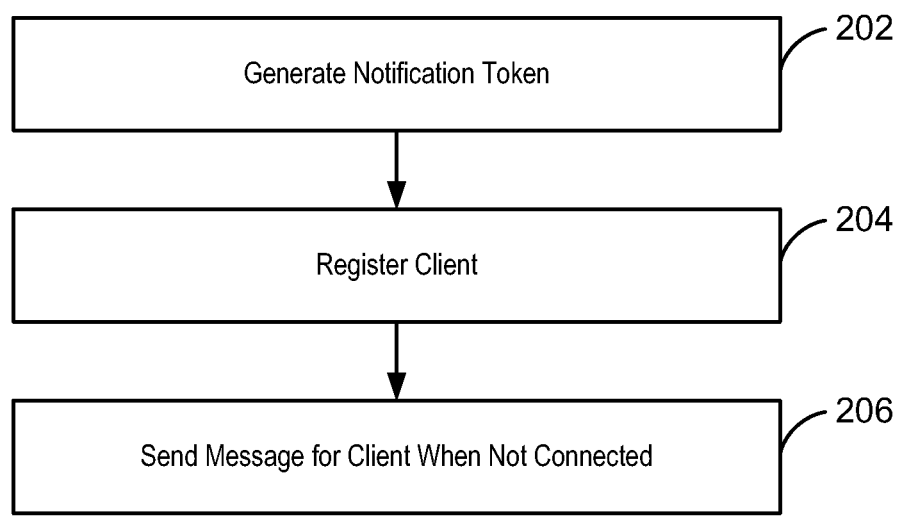
FIG. 2 is a process flow diagram of a communications method for clients in accordance with the claimed subject matter.

FIG. 2 is a process flow diagram of a communications method 200 for clients 102 in accordance with the claimed subject matter. In one embodiment, the messaging system may perform the method 200.

The method 200 begins at block 202, where the notification service 108 may generate a notification token. The notification token may be used by the messaging system 110 to identify the recipient of the notifications it sends to through the notification service 108. The client 102 may upload the notification token to the messaging system 110 in addition to the notification service information.

At block 204, the messaging system 110 may register the client 102 to receive communications from the messaging system 110. Registering the client 102 may include storing notification service and token information for the client 102. The notification channel information together with the notification token may provide an address for contacting the client 102 via the notification service 108.

If, however, the client 102 is not connected to messaging system, and there is a message from the server for the client 102, at block 206, the messaging system 110 may send the message to the non-connected client 102 using the notification service.

FIGS. 3-8 are message flow diagrams for typical communications scenarios according to the protocol described above in accordance with the claimed subject matter. These commands may be performed in an implementation of the protocol described above. In these figures, the abbreviation EP, shorthand for endpoint, is a reference to the client 102.

The commands of this protocol may be supported by standard HTTP methods. For example, the scenarios illustrated with reference to FIGS. 3-8, show an example implementation of the commands using standard HTTP methods. Standard HTTP methods may include: OPTIONS, GET, HEAD, PUT, POST, DELETE, TRACE, and CONNECT.

As stated previously, the protocol may include a set of commands for binding, subscribing, sending messages, query and updating presence information, establishing 2 party and multi-part conversations etc.

The registration command may create a client entity in the messaging system 110 and return an authentication token to the client. The un-register command may delete the client entity from the messaging system 110. In one embodiment, the client 102 may specify other client entities to be deleted according to specified permissions.

Once the client entity is registered to the messaging system 110, the corresponding client 102 may publish its presence using the update client command. Parameters specified in the command may include notification channel information for each operation that the client 102 supports. Parameters may also include a notification type that specifies how notifications are delivered to the client 102. One type of notification may specify that the command is included in the notification payload. Another type may specify that the command is not included, e.g., shoulder tapping.

One embodiment may include a command for sending a message to a buddy without establishing a connection to the cloud. The notification channel or a command to messaging system 110 to get the queued message from the messaging system 110 may be used.

A command for subscribing may be used to enable the client to subscribe to buddies. Subscribing to buddies enables the client 102 to be automatically notified of updates to the buddies presence statuses. The client 102 may only specify a filter to be applied to the buddy list to subscribe to subscribe to a subset of the buddies. The messaging system 110 may retrieve contact lists from another cloud service that maintains the client's buddy list. The client 102 may use this command to subscribe to a specific buddy. The client 102 may similarly unsubscribe to buddies, services, etc.

The query buddy presence command may enable the client 102 to determine the presence status of one or more contacts of the user. A buddy list may be used to determine which contact's presence status to receive. For example, an empty contact list may result in the messaging system 110 fetching the presence status all the user's contacts. In one embodiment, filter and view selections may be used to improving the accuracy of response, reduce packet size of responses. For example, view options may include various presence elements such as availability for messaging, availability for video calls, etc. Filter options may be used to filter out hidden contacts, groups, offline contacts, etc.

The message command may deliver messages to the client. In one embodiment, the typical send message commands may be configured to support the notification service 108 and reduce bandwidth consumption. For example, the client 102 may receive these commands in the notification payload or in the body of the response to the get queued messages command. This may be based on client preferences.

The get queued messages command may be used to retrieve queued notifications and messages. In one embodiment, the client 102 may send poll the messaging system 110 until all cached notifications are retrieved. The protocol may provide a command for getting the queued messages and a separate command for deleting those messages from the messaging system 110.

A set of commands for creating a temporary multiparty conversation, inviting buddies, sending messages, updating and getting presence information in the context of this multiparty conversation may be used to allow typical multiparty conversation operations.

Figure 3:
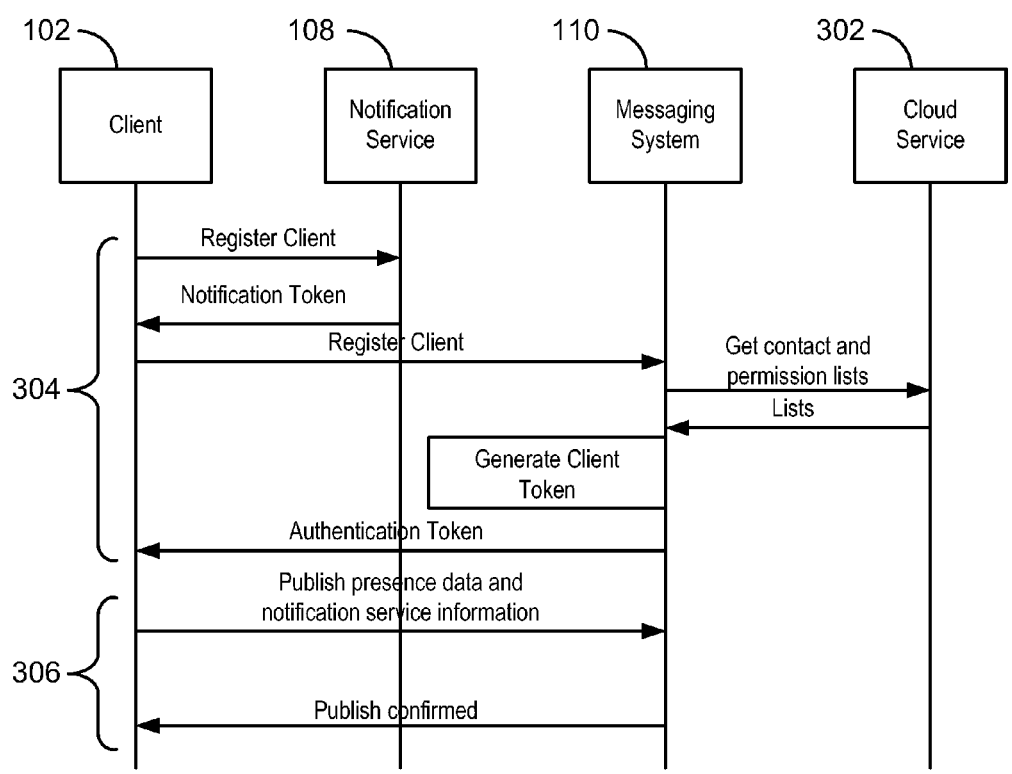
FIG. 3 is a message flow diagram for creating a client entity in the network in accordance with the claimed subject matter.

FIG. 3 is a message flow diagram 300 for creating a client entity in the messaging system 110 in accordance with the claimed subject matter. The message flow diagram 300 includes messages 304, 306. The messages 304 may authorize client access to the messaging system 110. In response to a request from the client 102, the messaging system 110 may retrieve an access list from a cloud service that maintains the client buddy access control lists 302, and may generate a client authentication token, which is sent to the client 102.

The messages 306 may register the client 102 with the messaging system 110 for notifications in the non-connected mode. A registration request including the notification token may be sent to the messaging system 110. This results in the notification token and client presence data being stored with the messaging system 110. The notification token provides an address that the messaging system 110 can use to send messages from the messaging system 110 to the client 102 when not connected. In FIG. 3, the Authentication token is not included in the registration messages 306. In one embodiment, the authentication token may be included.

The messages described with reference to FIGS. 3-8 may be communicated along typical communication channels. The type of communication channel for any particular message may vary depending on the sender and receiver of the message.

In one embodiment, the client 102 may send a registration command with an authorization token, e.g., a user ticket, to the messaging system 110. Alternatively, the endpoint can send a batch of registration and other commands to minimize the calls from the client to the messaging system 110. The client 102 may not maintain a connection to the messaging system 110 during the process of registration, authentication and setting initial presence information.

The messaging system 110 may authenticate the client using the authorization token. The messaging system 110 may create a client entity, bind a user to the client, and send back the client authentication token. The client 102 may use the authentication token to identify itself to the messaging system 110 for future communications.

Once the client entity is created, the client 102 may publish its presence (availability, capabilities, etc.) to the messaging system 110. Alternatively, the messaging system 110 may maintain the client's presence.

By registering with the messaging system 110, the client 102 may receive notifications on presence changes and messages. The client 102 may also specify whether notifications do not include the actual packet in the notification payload, i.e., shoulder tapping.

Figure 4:
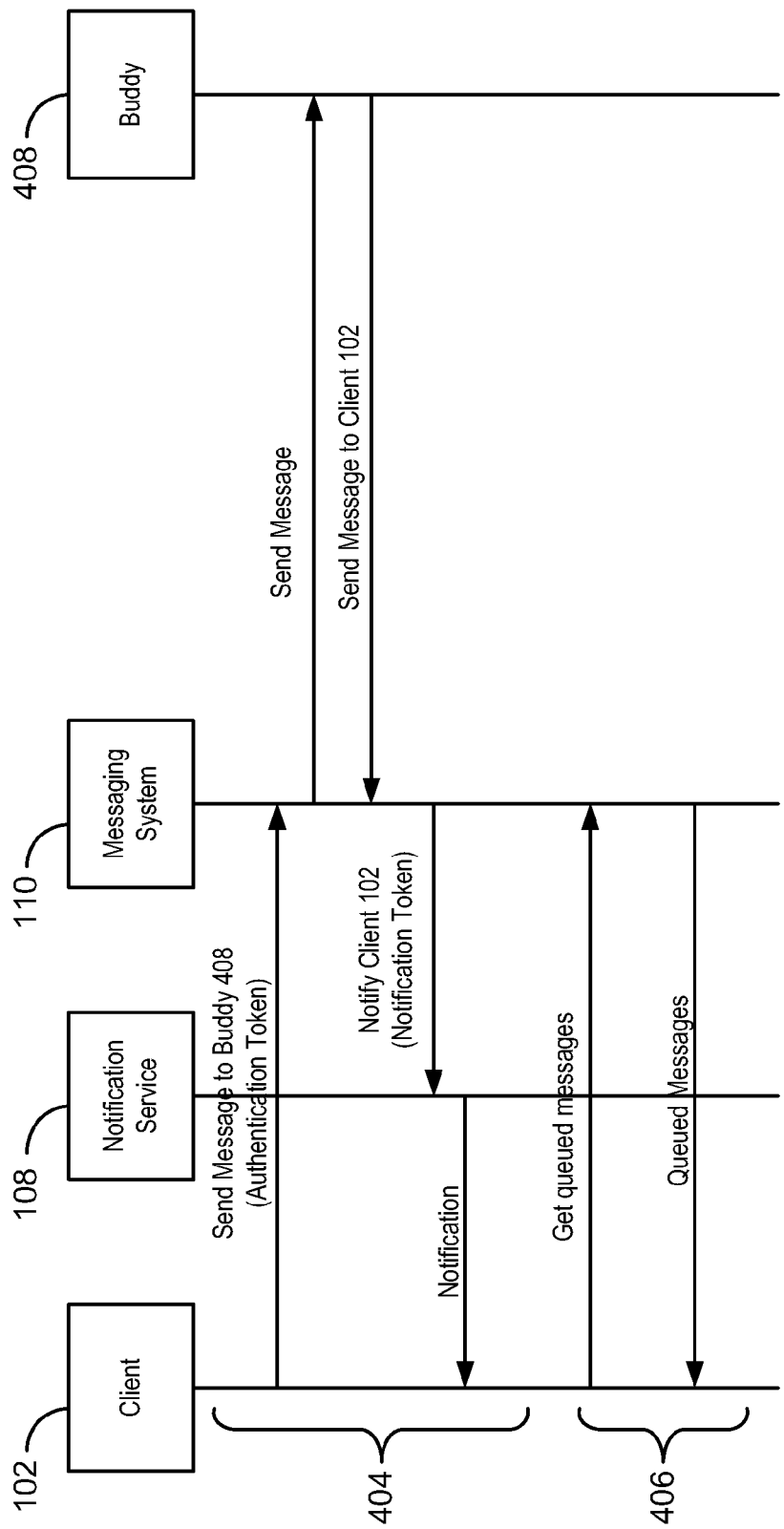
FIG. 4 is a message flow diagram for sending a message in accordance with the claimed subject matter.

FIG. 4 is a message flow diagram 400 for sending a message in accordance with the claimed subject matter. The message flow diagram 400 includes messages 404, 406. The messages 404 may, while not connected, allow the client 102 to send a message using the authentication token. The messages 406 may enable the client 102 to receive instant messages from other clients 102. As shown, a get queued messages command may be used to retrieve messages from the queue 206.

Figure 5:
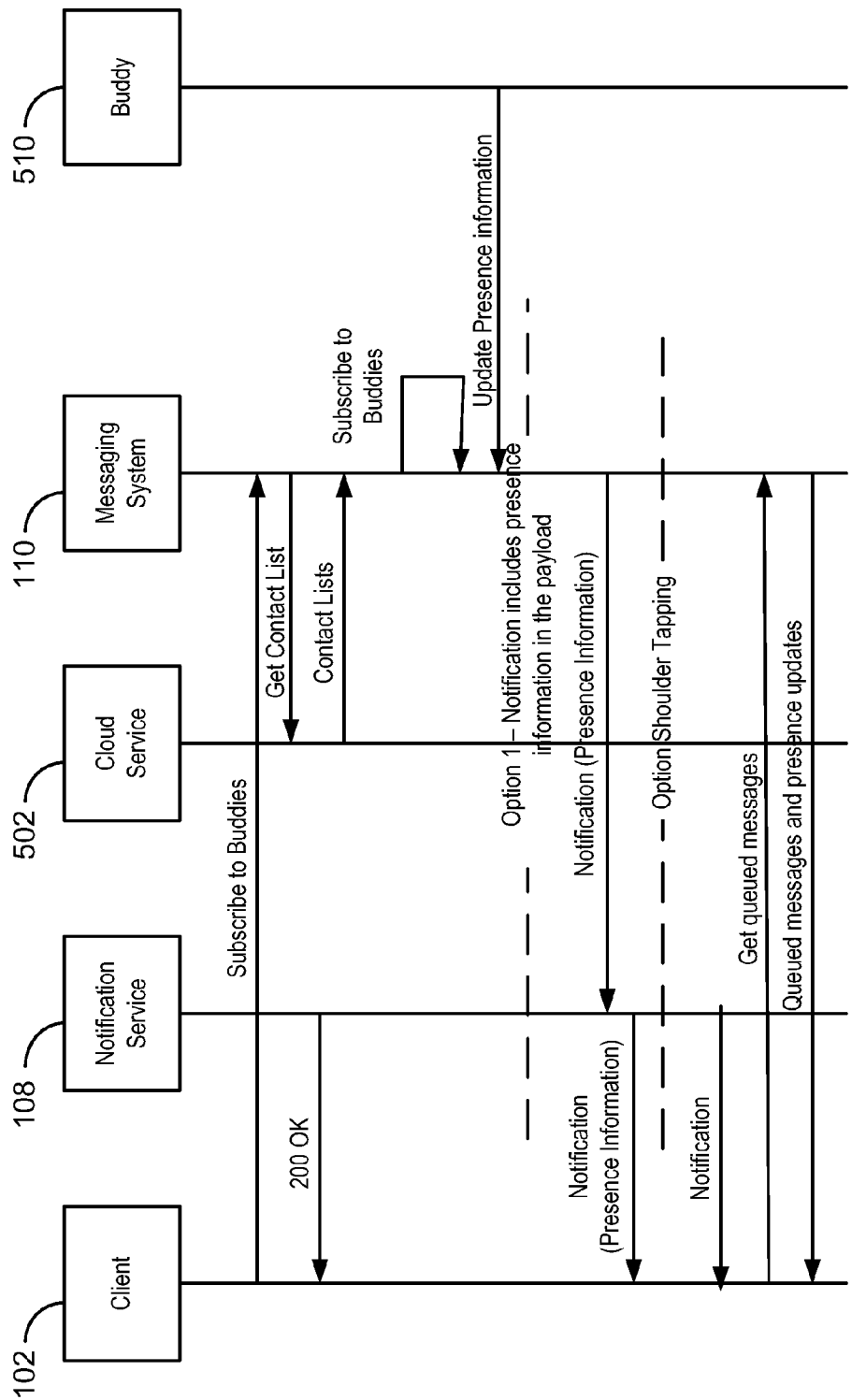
FIG. 5 is a message flow diagram for subscribing in accordance with the claimed subject matter.

FIG. 5 is a message flow diagram 500 for subscribing in accordance with the claimed subject matter. The client 102 may subscribe to a contact's presence by sending a subscribe command with lists specified in the command's body. The messaging system 110 may retrieve buddy lists from another cloud service that maintains the client's buddy list 502.

Presence notifications may be sent to the client's messaging system 110. Once the messaging system 110 gets a buddy's presence notification, the messaging system 110 may send a notification to the notification service 108 and identifying the target client using the notification token.

In one embodiment, the messaging system 110 may cache the notification, and just send a shoulder tap notification to the notification service 108. In such an embodiment, the client 102 may retrieve the cached notification by sending a get queued messages command to the messaging system 110.

Figure 6:
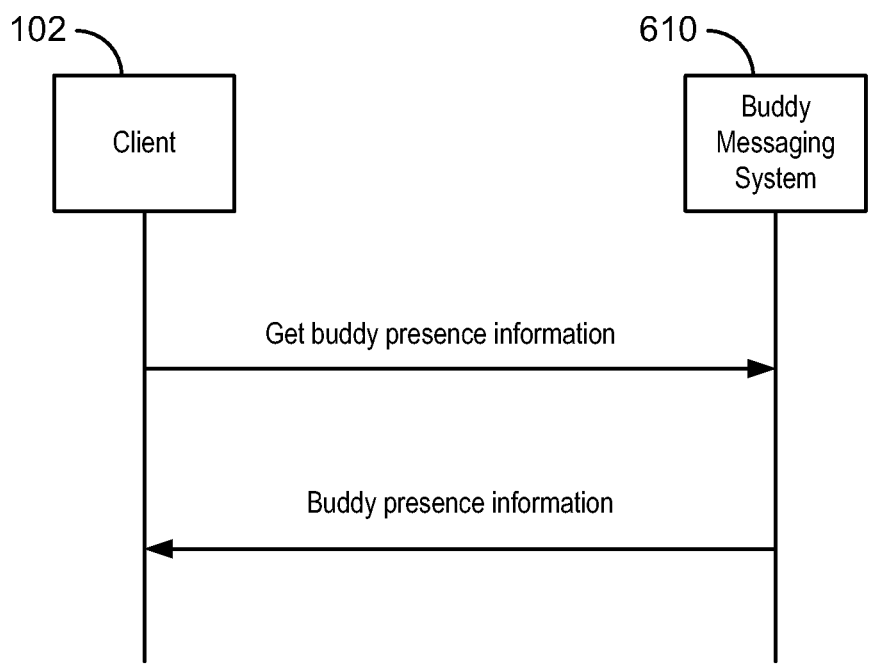
FIG. 6 is a message flow diagram for querying a buddy presence in accordance with the claimed subject matter.

FIG. 6 is a message flow diagram 600 for querying a buddy presence in accordance with the claimed subject matter. As shown, the client 102 may query the presence of a buddy using the authentication token.

Figure 7:
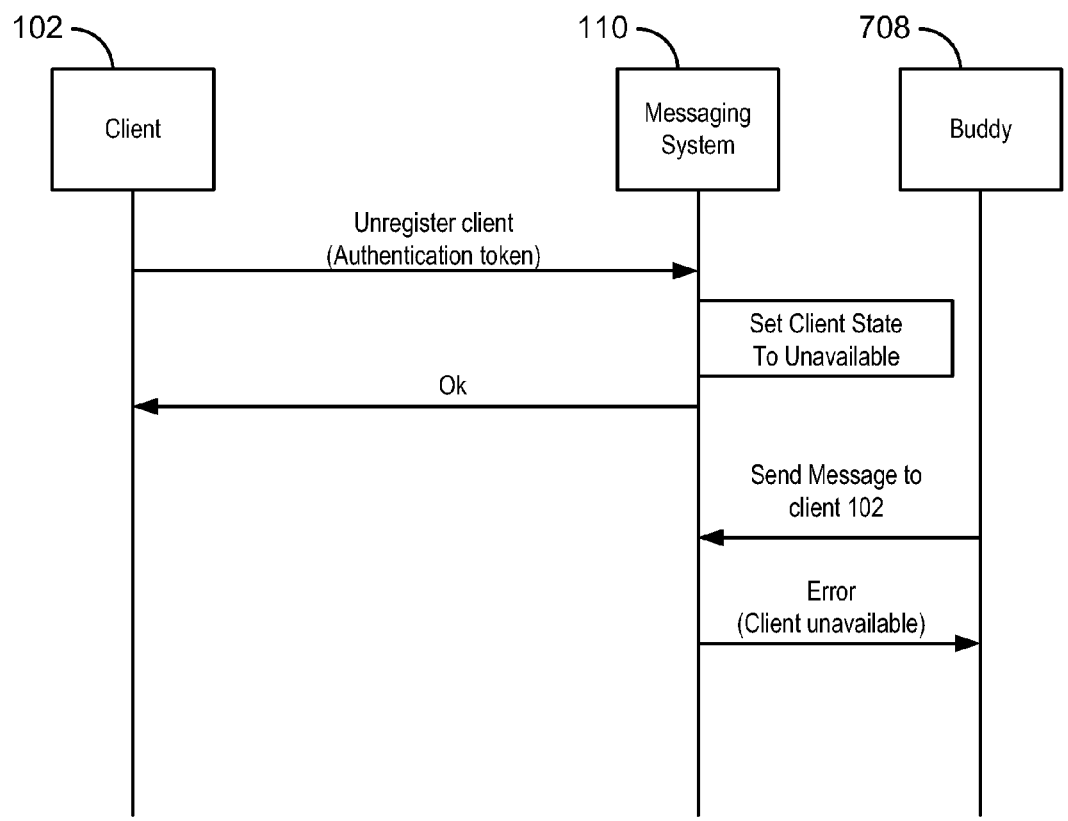
FIG. 7 is a message flow diagram for deleting a client entity in accordance with the claimed subject matter.

FIG. 7 is a message flow diagram 700 for unregistering a client entity in accordance with the claimed subject matter. This request may specify the authentication token in a unregister command to the messaging system 110. The messaging system 110 may delete the client entity represented by the client authentication token from the cloud.

To unregister the client 102 from the messaging system 110, the messaging system 110 may set a client state to unavailable. As such, any further messages to the client 102 may be dropped, with an error returned to the sender.

Figure 8:
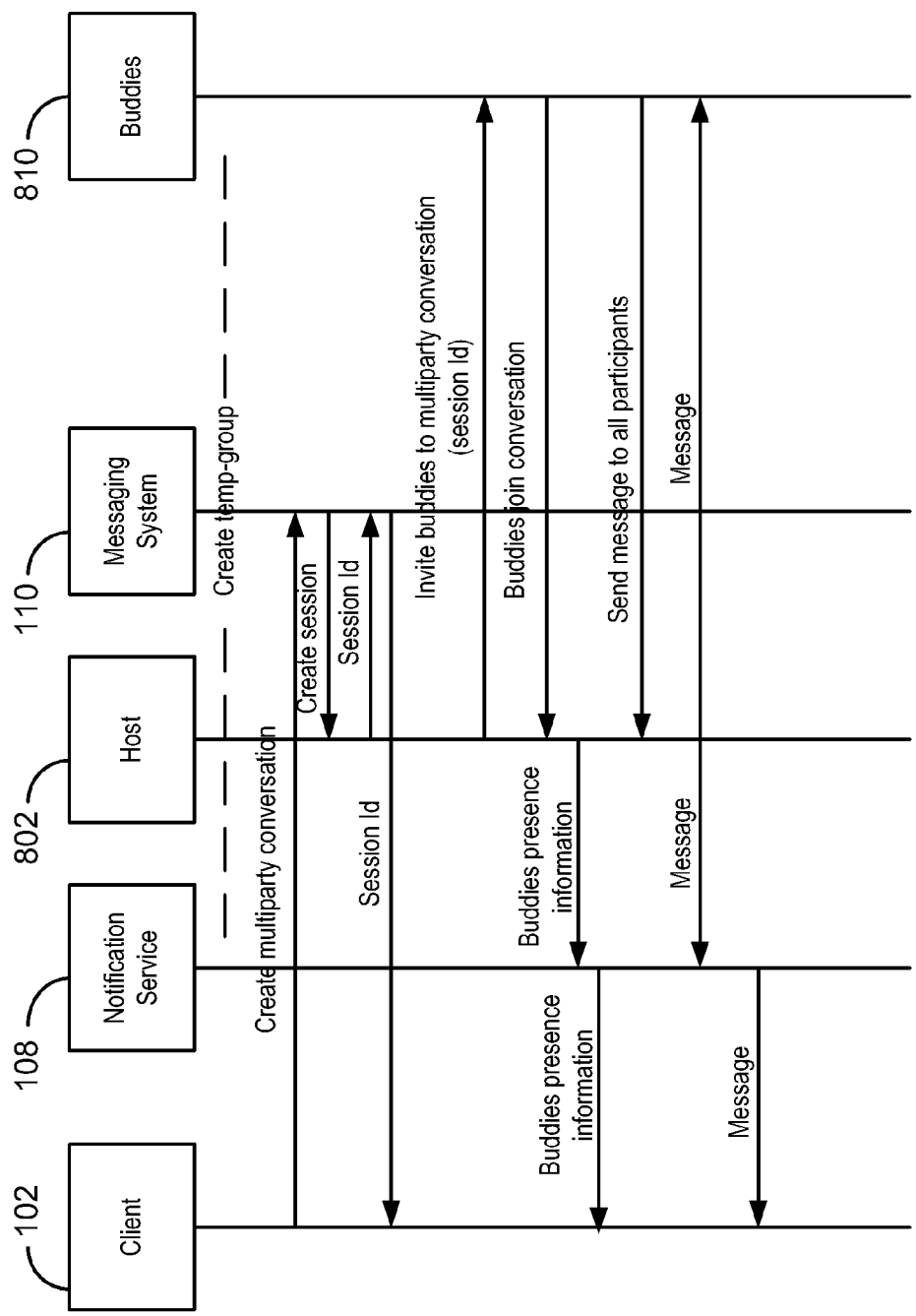
FIG. 8 is a message flow diagram for multiparty conversation in accordance with the claimed subject matter.

FIG. 8 is a message flow diagram 800 for multiparty conversation in accordance with the claimed subject matter. For multiparty conversation, a roster list may be hosted on a host 802. The host 802 may be a component of the messaging system 110. The conversation may be identified as a temporary group.

As stated previously, existing messaging systems may be modified to accommodate the non-connected mode described above. These modifications may introduce issues with load balancing, throttling, and geo-hosting. In one embodiment, the messaging system 110 may use various load-balancing techniques to address the change in the client connection mode. A global load-balancing system may be used for balancing the load across multiple geographical cloud locations.

Additionally, the messaging system 110 may use various throttling techniques to control the use of its resources by the clients and to protect itself from malicious usage.

Figure 9:
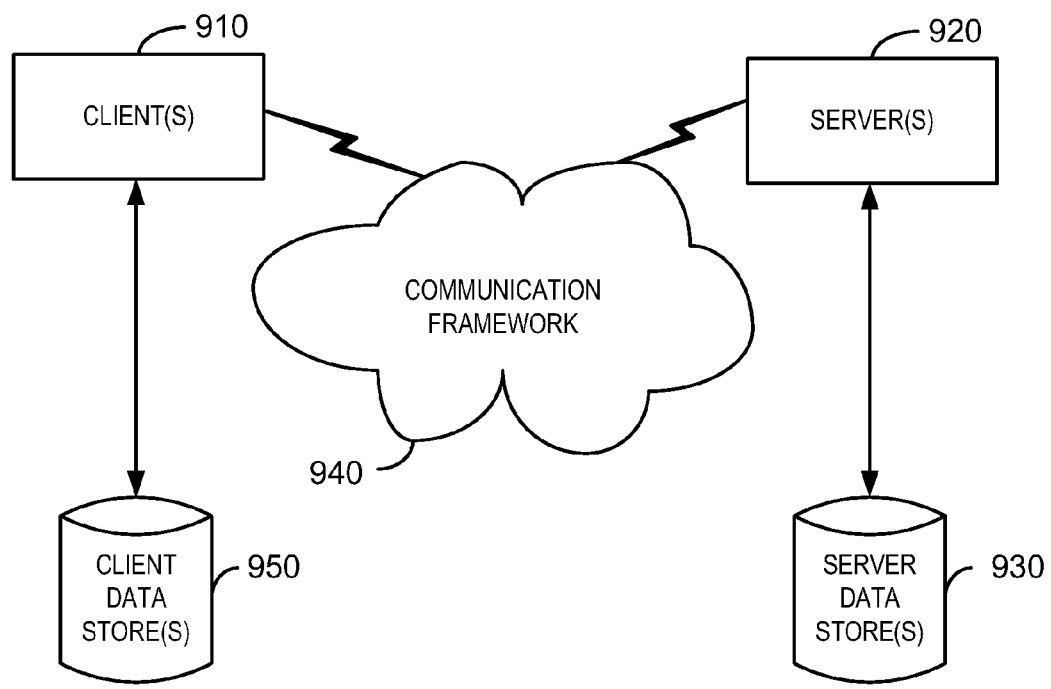
FIG. 9 is a block diagram of an exemplary networking environment wherein aspects of the claimed subject matter can be employed.

FIG. 9 is a block diagram of an exemplary networking environment 900 wherein aspects of the claimed subject matter can be employed. Moreover, the exemplary networking environment 900 may be used to implement a system and method of communicating with non-connected clients.

The networking environment 900 includes one or more client(s) 910. The client(s) 910 can be hardware and/or software (e.g., threads, processes, computing devices). As an example, the client(s) 910 may be computers providing access to servers over a communication framework 940, such as the Internet.

The environment 900 also includes one or more server(s) 920. The server(s) 920 can be hardware and/or software (e.g., threads, processes, computing devices). The server(s) 920 may include network storage systems. The server(s) may be accessed by the client(s) 910.

One possible communication between a client 910 and a server 920 can be in the form of a data packet adapted to be transmitted between two or more computer processes. The environment 900 includes a communication framework 940 that can be employed to facilitate communications between the client(s) 910 and the server(s) 920.

The client(s) 910 are operably connected to one or more client data store(s) 950 that can be employed to store information local to the client(s) 910. The client data store(s) 950 may be located in the client(s) 910, or remotely, such as in a cloud server. Similarly, the server(s) 920 are operably connected to one or more server data store(s) 930 that can be employed to store information local to the servers 920.

Figure 10:
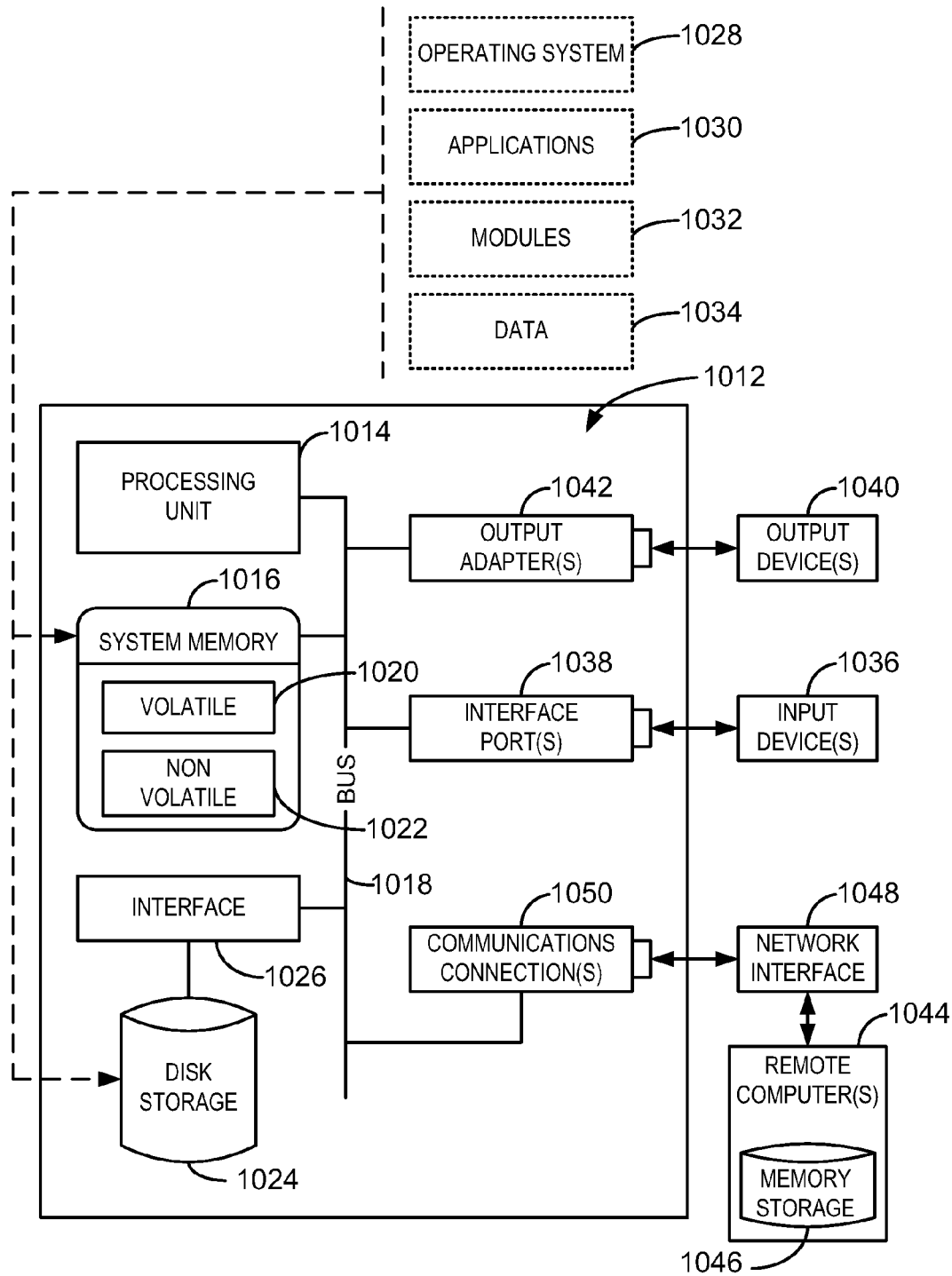
FIG. 10 is a block diagram of an exemplary operating environment for implementing various aspects of the claimed subject matter.

With reference to FIG. 10, an exemplary operating environment 1000 is shown for implementing various aspects of the claimed subject matter. The exemplary operating environment 1000 includes a computer 1012. The computer 1012 includes a processing unit 1014, a system memory 1016, and a system bus 1018.

The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures known to those of ordinary skill in the art. The system memory 1016 comprises non-transitory computer-readable storage media that includes volatile memory 1020 and nonvolatile memory 1022.

The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), or flash memory.

Volatile memory 1020 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), SynchLink™ DRAM (SLDRAM), Rambus® direct RAM (RDRAM), direct Rambus® dynamic RAM (DRDRAM), and Rambus® dynamic RAM (RDRAM).

The computer 1012 also includes other non-transitory computer-readable media, such as removable/non-removable, volatile/non-volatile computer storage media. FIG. 10 shows, for example a disk storage 1024. Disk storage 1024 includes, but is not limited to, devices like a magnetic disk drive, floppy disk drive, tape drive, Jaz drive, Zip drive, LS-100 drive, flash memory card, or memory stick.

In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in the suitable operating environment 1000. Such software includes an operating system 1028. Operating system 1028, which can be stored on disk storage 1024, acts to control and allocate resources of the computer system 1012.

System applications 1030 take advantage of the management of resources by operating system 1028 through program modules 1032 and program data 1034 stored either in system memory 1016 or on disk storage 1024. It is to be appreciated that the claimed subject matter can be implemented with various operating systems or combinations of operating systems.

A user enters commands or information into the computer 1012 through input device(s) 1036. Input devices 1036 include, but are not limited to, a pointing device (such as a mouse, trackball, stylus, or the like), a keyboard, a microphone, a joystick, a satellite dish, a scanner, a TV tuner card, a digital camera, a digital video camera, a web camera, and/or the like. The input devices 1036 connect to the processing unit 1014 through the system bus 1018 via interface port(s) 1038. Interface port(s) 1038 include, for example, a serial port, a parallel port, a game port, and a universal serial bus (USB).

Output device(s) 1040 use some of the same type of ports as input device(s) 1036. Thus, for example, a USB port may be used to provide input to the computer 1012, and to output information from computer 1012 to an output device 1040.

Output adapter 1042 is provided to illustrate that there are some output devices 1040 like monitors, speakers, and printers, among other output devices 1040, which are accessible via adapters. The output adapters 1042 include, by way of illustration and not limitation, video and sound cards that provide a means of connection between the output device 1040 and the system bus 1018. It can be noted that other devices and/or systems of devices provide both input and output capabilities such as remote computer(s) 1044.

The computer 1012 can be a server hosting various software applications in a networked environment using logical connections to one or more remote computers, such as remote computer(s) 1044. The remote computer(s) 1044 may be client systems configured with web browsers, PC applications, mobile phone applications, and the like.

The remote computer(s) 1044 can be a personal computer, a server, a router, a network PC, a workstation, a microprocessor based appliance, a mobile phone, a peer device or other common network node and the like, and typically includes many or all of the elements described relative to the computer 1012.

For purposes of brevity, only a memory storage device 1046 is illustrated with remote computer(s) 1044. Remote computer(s) 1044 is logically connected to the computer 1012 through a network interface 1048 and then physically connected via a communication connection 1050.

Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to the computer 1012. The hardware/software for connection to the network interface 1048 may include, for exemplary purposes only, internal and external technologies such as, mobile phone switches, modems including regular telephone grade modems, cable modems and DSL modems, ISDN adapters, and Ethernet cards.

An exemplary processing unit 1014 for the server may be a computing cluster comprising Intel® Xeon CPUs. The disk storage 1024 may comprise an enterprise data storage system, for example, holding thousands of impressions.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage media having computer-executable instructions for performing the acts and/or events of the various methods of the claimed subject matter.

There are multiple ways of implementing the subject innovation, e.g., an appropriate API, tool kit, driver code, operating system, control, standalone or downloadable software object, etc., which enables applications and services to use the techniques described herein. The claimed subject matter contemplates the use from the standpoint of an API (or other software object), as well as from a software or hardware object that operates according to the techniques set forth herein. Thus, various implementations of the subject innovation described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical).

Additionally, it can be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A method for communicating with a client, comprising the following computer-implemented steps:
    registering, at a messaging system, the client to a notification service;
    receiving, at the messaging system, a notification token that identifies the client from the notification service;
    detecting, at the messaging system, notification channel information used to communicate with the client;
    storing, at the messaging system, the notification channel information, which is used to communicate back to the client;
    registering, at the messaging system, the client to receive a message via the notification service if the client is not connected to the messaging system via a session;
    providing, from the messaging system, an authentication token to the client;
    sending, from the messaging system, a first message to a buddy using the authentication token while the buddy is not connected to the messaging system;
    sending, from the messaging system via the notification service as an intermediate node between the messaging system and the client, a second message to the client based on the notification token; and
    providing, from the messaging system, a third message to the client, wherein the client specifies whether the second message includes an actual packet comprising message data in a payload or not based on registration to the notification service.

2. The method recited in claim 1, wherein the notification service sends the first message through a notification channel, wherein the notification channel comprises a hypertext transfer protocol secured (HTTPS) channel.

3. The method recited in claim 1, wherein registering the client comprises storing a notification channel uniform resource locator (URL) for the client.

4. The method recited in claim 3, comprising receiving a fourth message specifying the notification channel URL.

5. The method recited in claim 1, wherein the second message is generated by a second client.

6. The method recited in claim 1, comprising subscribing the client to a buddy, wherein the buddy comprises a buddy client, wherein the notification channel is used to send presence status updates of the buddy client to the client if the client is not connected.

7. The method recited in claim 6, comprising subscribing to one of:
    a buddy list comprising one or more buddies;
    a service; and
    a network.

8. The method recited in claim 1, wherein the second message comprises a shoulder tap.

9. The method recited in claim 8, comprising sending a fourth message to the client corresponding to the shoulder tap, wherein the fourth message comprises a payload associated with the fourth message.

10. A messaging system for communicating with a client, comprising:
- a processing unit of the messaging system; and
- a system memory of the messaging system, wherein the system memory comprises code configured to direct the processing unit to:
  - register, at the messaging system, the client to a notification service;
  - receive, at the messaging system, a notification token that identifies the client from the notification service;
  - detect, at the messaging system, notification channel information used to communicate with the client;
  - store, at the system memory of the messaging system, the notification channel information, which is used to communicate back to the client;
  - register, at the messaging system, the client to receive a message via the notification service if the client is not connected to the messaging system via a session;
  - provide, from the messaging system, an authentication token to the client;
  - send, from the messaging system, a first message to a buddy using the authentication token while the buddy is not connected to the messaging system;
  - send, from the messaging system via the notification service, a second message to the client based on the notification token; and
  - provide, from the messaging system, a third message to the client, wherein the client specifies whether the second message includes an actual packet comprising message data in a payload or not based on registration to the notification service.

11. The system recited in claim 10, wherein the code is configured to direct the processing unit to register the client by storing a notification channel uniform resource locator (URL) for the client.

12. The system recited in claim 10, wherein the code is configured to direct the processing unit to receive a fourth message from the client specifying the notification channel URL.

13. The system recited in claim 10, wherein the second message is generated by a second client.

14. The system recited in claim 10, wherein the second message comprises a shoulder tap.

15. The system recited in claim 14, wherein the code is configured to direct the processing unit to send a fourth message to the client, wherein the fourth message corresponds to the shoulder tap, and wherein the fourth message comprises a the payload associated with the fourth message.

16. One or more computer-readable storage memory device, comprising code configured to direct a processing unit to:
- register, at a messaging system, the client to a notification service;
- receive, at the messaging system, a notification token that identifies a client from the notification service;
- detect, at the messaging system, notification channel information used to communicate with the client at the messaging service;
- store, at the messaging system, the notification channel information, which is used to communicate back to the client server;
- register, at the messaging system, the client to receive a message via the notification service if the client is not connected to the messaging system via a session;
- provide, from the messaging system, an authentication token to the client;
- send, from the messaging system, a first message to a buddy using the authentication token while the buddy is not connected to the messaging system;
- send, from the messaging system via the notification service, a second message to the client based on the notification token; and
- provide, by the messaging system, a third message from the messaging system to the client, wherein the client specifies whether the second message includes an actual packet comprising message data in a payload or not based on registration to the notification service.

17. The computer-readable storage memory device recited in claim 16, wherein the code is configured to direct the processing unit to register the client by storing a notification channel uniform resource locator (URL) for the client at the messaging service.

18. The computer-readable storage memory device recited in claim 17, wherein the code is configured to direct the processing unit to receive a fourth message from the client specifying the notification channel URL.

19. The computer-readable storage memory device recited in claim 16, wherein the second message is generated by a second client.

20. The computer-readable storage memory device recited in claim 16, wherein the second message comprises a shoulder tap, and wherein the code is configured to direct the processing unit to send a fourth message to the client, wherein the fourth message corresponds to the shoulder tap, and wherein the fourth message comprises a payload associated with the fourth message.

* * * * *